US006545677B2

(12) United States Patent
Brown

(10) Patent No.: US 6,545,677 B2
(45) Date of Patent: Apr. 8, 2003

(54) METHOD AND APPARATUS FOR MODELING SPECULAR REFLECTION

(75) Inventor: Russell A. Brown, Palo Alto, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 34 days.

(21) Appl. No.: 09/845,781

(22) Filed: Apr. 30, 2001

(65) Prior Publication Data

US 2001/0048434 A1 Dec. 6, 2001

Related U.S. Application Data

(63) Continuation of application No. 09/316,335, filed on May 21, 1999, now Pat. No. 6,226,007.

(51) Int. Cl.$^7$ .............................................. G06T 15/60

(52) U.S. Cl. ..................................................... 345/426

(58) Field of Search ................................ 345/426, 420, 345/474, 473, 582

(56) References Cited

U.S. PATENT DOCUMENTS

| 4,709,231 A | 11/1987 | Sakaibara et al. |
| 5,253,339 A | 10/1993 | Wells et al. |
| 5,659,671 A | 8/1997 | Tannenbaum et al. |
| 5,704,024 A | * 12/1997 | Voorhies et al. ............. 345/426 |
| 6,300,960 B1 | * 10/2001 | DeRose et al. ............. 345/474 |

OTHER PUBLICATIONS

Bao et al., "Shading Models for Linear and Area Light Sources," Computers and Graphics, Mar. 1993, pp. 137–145, vol. 17, No. 2, Headington Hill Hall, Oxford, Great Britain.

Kappel, M.R., "Shading: Fitting a Smooth Intensity Surface," Computer–Aided Design, Aug. 1995, pp. 595–603, vol. 27, No. 8, Jordan Hill, Oxford, Great Britain.

Gouraud, H., "Continuous Shading of Curved Surfaces," IEEE Transactions on Computers, Jun. 1971, pp. 623–629, vol. C–20, No. 6.

Foley et al., "Fundamentals of Interactive Computer Graphics," Jul. 1984, Addison–Wesley Publishing Company.

Phong, B.T., "Illumination for Computer Generated Pictures," Communications of the ACM, Jun. 1975, pp. 311–317, vol. 18, No. 6.

Blinn, J., "Models of Light Reflection for Computer Synthesized Pictures," Proc. Siggraph 77, pp. 192–198, vol. 11, No. 2, ACM Press, New York.

Bishop et al., "Fast Phong Shading," Proc. Siggraph 86, pp. 103–106, vol. 20, No. 4, ACM Press, New York.

Shantz et al., "Shading Bicubic Patches," Proc. Siggraph 87, pp. 189–196, vol. 21, No. 4, ACM Press, New York.

Kirk et al., "The Rendering Architecture of the DN10000VS," Computer Graphics, Aug. 1990, pp. 299–307, vol. 24, No. 4.

* cited by examiner

Primary Examiner—Mark Zimmerman
Assistant Examiner—Lance W. Sealey
(74) Attorney, Agent, or Firm—Sunnison, McKay & Hodgson, L.L.P.; Philip J. McKay

(57) ABSTRACT

A method and apparatus for modeling the specular reflection of light from an object is disclosed. In accordance with one embodiment of the method, a portion of the object is modeled by one or more surfaces each having at least one vertex and an edge point corresponding to an edge. A sine value associated with a highlight angle is determined at each vertex and edge point, and a control value is determined at each vertex and edge point using the sine values. A specular input component at each point on the surface is determined using the control values. The specular input component is utilized to determine the specular light component at that particular point. Embodiments of apparatus implementing the method are also disclosed.

33 Claims, 3 Drawing Sheets

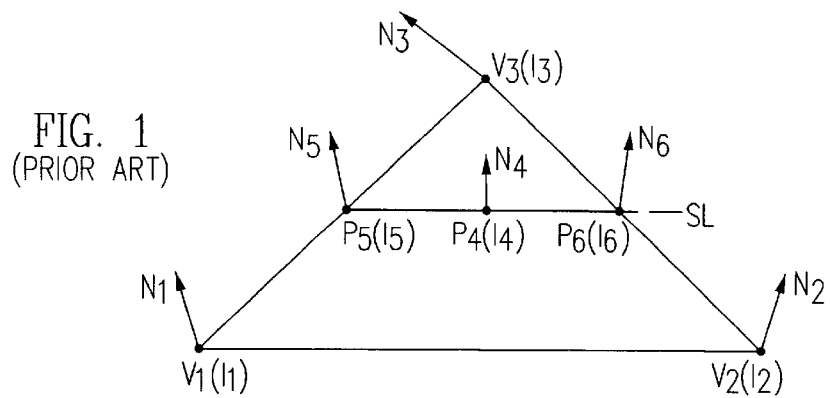
FIG. 1
(PRIOR ART)
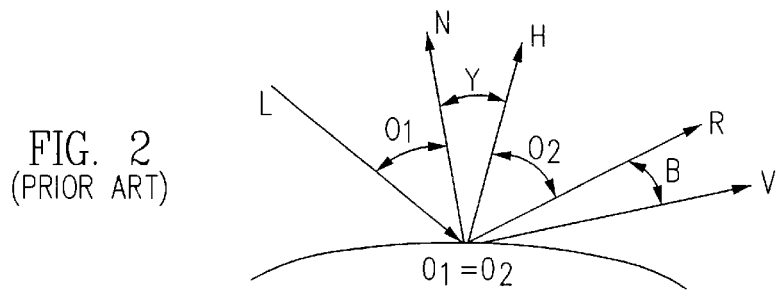
FIG. 2
(PRIOR ART)
FIG. 3
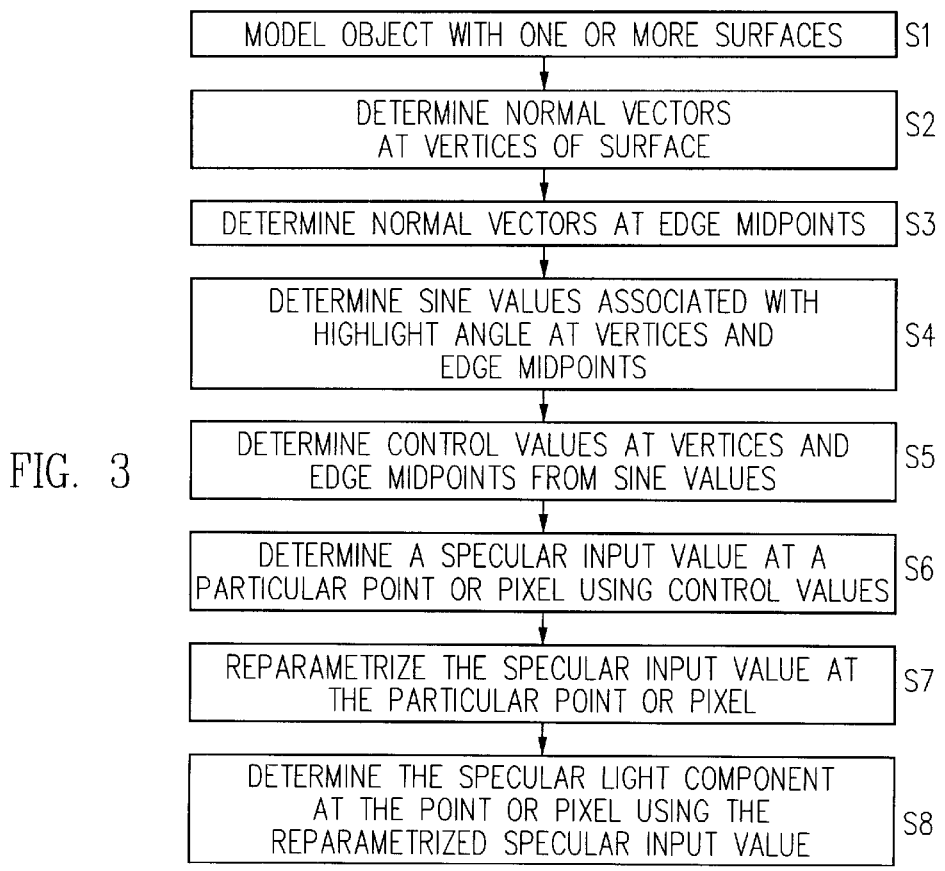

METHOD AND APPARATUS FOR MODELING SPECULAR REFLECTION

This a continuation of application Ser. No. 09/316,335 filed May 21, 1999 now U.S. Pat. No. 6,226,007.

FIELD OF THE INVENTION

The invention relates to a method and an apparatus for modeling the specular reflection of light from a surface.

BACKGROUND OF THE INVENTION

Computer generated images are created from models of objects. It is desirable that the object depicted in a computer generated image resemble the real object to the maximum extent possible. In some instances, the real object specularly reflects light. That is, when viewed at one or more angles, the object reflects light directly from a light source to the viewer. This specularly reflected light appears as a shiny area on the surface of the object.

As an example, when light is projected onto the outer waxy surface of an apple, at one or more angles the light is directly reflected from a source to the viewer and appears as a shiny spot on the apple. In order to graphically portray the image of an apple, it is desirable to display the "shiny spot" on the image of the apple which one would see if viewing the apple in real life.

One method for modeling the specular reflection associated with an object is to utilize a modified version of Gouraud shading. This method will be described with reference to FIG. 1.

First, the surface to be imaged is divided into a number of polygons, such as triangles, the polygons having common vertices. Vectors normal to the surface $N_1$, $N_2$, $N_3$ are calculated at each vertex $V_1$, $V_2$, $V_3$. Using these normal vectors, the light intensity $I_1$, $I_2$, $I_3$ at each vertex $V_1$, $V_2$, $V_3$ is calculated with a light intensity equation. One such equation which accounts for the light intensity from ambient, diffuse and specular components is the equation $I=I_a{}^*k_a+Ii^*[k_d(L\cdot N)+k_s(R\cdot V)^n]$.

In this equation, $I_a{}^*k_a$ represents the ambient light intensity component and $k_d(L\cdot N)$ is the diffuse light intensity component. These components, while not necessary to the calculation of the specularly reflected light component, are instrumental in generating an image which accounts for light which impinges on the object from a variety of sources (the ambient component) and the light which impinges on the object from a particular source and is diffusely reflected (the diffuse component). In this portion of the equation, the ambient intensity component is dependent upon the ambient light intensity $I_a$, while the diffuse component is dependent upon the intensity $I_i$ of a particular light source. The term $k_s(R\cdot V)^n$ is the specularly reflected light intensity component, which is also dependent upon the light source intensity $I_i$.

In the equation, $k_a$, $k_d$ and $k_s$ are the ambient, diffuse and specular reflection constants. The value of these constants depends upon a number of factors, such as the texture of the surface which is being modeled or imaged.

L is the light vector, V is the viewing vector and R is the reflection vector. One arrangement of the inter-relationship of the L, V and R vectors is illustrated in FIG. 2. In accordance with this light intensity equation, the dot product of the vectors R and V (i.e. $R\cdot V$) represents the cosine of the angle between the two vectors. The R vector may be calculated in accordance with the equation $R=2^*(N\cdot L)^*N-L$. Likewise, the dot product of the vectors L and N (i.e. $L\cdot N$) represents the cosine of the angle between these two vectors.

In accordance with the Gouraud method, once the intensity of the light is calculated at each vertex of the polygon, the intensity of the light is then linearly interpolated to each other point on the polygon (each point corresponding to a display pixel). For example, referring again to FIG. 1, the light intensity $I_4$ at a point $P_4$ along a scan line SL is interpolated by first interpolating the light intensities $I_5$ and $I_6$ at the intersection of the scan line with the polygon edges at points $P_5$ and $P_6$. The intensities $I_5$ and $I_6$ are interpolated from the intensities $I_1$ and $I_3$, and $I_2$ and $I_3$ at the vertices, respectively. The intensity $I_4$ is then interpolated from the light intensities $I_5$ and $I_6$.

This method is discussed in Gouraud, "Continuous Display of Curved Surfaces," Ph. D. dissertation, Department of Computer Science, University of Utah, Salt Lake City, June 1971. This method is also discussed generally in "Fundamentals of Interactive Computer Graphics" by Foley, Van Dam and Addison-Wesley, 1984.

This method of calculating the specularly reflected light component has several problems. A first problem is that if no specular reflection component is present at a vertex of the polygon, then no specular reflection component will be yielded anywhere in that portion of the image derived from that polygon. This is the case since the specular component at all non-vertex points of the polygon are interpolated from the specular component at the vertices. In addition, this method may result in exaggerated intensity changes at discontinuities. As a result, the imaged object may not appear as the actual object would appear.

Another problem with this method is that the specular component is based upon the dot product of the R and V vectors. In other words, the specular component is based upon the cosine of the angle between these vectors. As is well known, the cosine function changes little at angles near 0 degrees. On the other hand, specular reflection only occurs at angles near 0 degrees. So that the specular function transitions smoothly from angles near 0 degrees to larger angles where no reflection is visible, the differences in the cosine values at these angles must be exaggerated. This can be accomplished by raising the cosine value by a power n. On the other hand, this makes the computation more demanding, and increases the error associated with calculation of the specular component.

Another method of modeling or calculating the specular reflection is known as the Phong method. In accordance with this method, a normal vector is calculated at each vertex of the polygon. The normal vector at other points of the polygon are interpolated from these vertex normals. The normal vector at a particular point or pixel is then normalized, i.e. turned into a unit vector, and the resulting normalized vector is used in the above-referenced light intensity calculation.

In the example illustrated in FIG. 1, the Phong method requires the calculation of the normal vectors $N_5$ and $N_6$ at points $P_5$ and $P_6$, as interpolated from the normal vectors at points $N_1$ and $N_3$, and $N_2$ and $N_3$, respectively. Then, the normal vector $N_4$ at point $P_4$ is calculated from the normal vectors $N_5$ and $N_6$. This normal vector $N_4$ is then normalized (i.e. converted to a unit vector) for use in the light intensity calculation.

This method is discussed in Foley, Van Dam and Addison-Wesley, supra, and in Phong, "Illumination of Computer-Generated Images," Ph.D. dissertation, Department of Electrical Engineering, University of Utah, July 1973.

There are several problems with the Phong method. First, the normal vector must be calculated at each point or pixel. In addition, this normal vector must be converted to a unit vector. The transformation of the normal vector into a unit normal vector requires the calculation of the reciprocal square root of the terms of the vector. These calculations are very demanding in terms of computational effort and time. In addition, the dot product of the R and V vectors must still be raised to an arbitrary power n. That this calculation must be done at each point or pixel also increases the calculation demands. As a result, the Phong method is more interesting from a theoretical perspective than actually useful when considering the computational demands of the method.

A problem associated with use of either of the above-identified models is that the calculation of the specular reflection component requires calculation of the reflection vector R. Because the reflection vector R may change at each point of a surface, the above-equations require the reflection vector R to be re-calculated at each individual point or pixel. Once again, this arrangement is computationally demanding.

As one attempt to overcome some of the above-stated problems, in the Blinn method of modeling specular highlights, the need for calculating the reflection vector R is eliminated by use of a vector H called the halfway vector. In accordance with this model, the value R·V is replaced with N·H, where H is a vector extending from the point halfway between the N and V vectors, i.e. H=(L+V)/2. The value N·H represents the cosine of the angle γ, as illustrated in FIG. 2. This method is discussed in Blinn, "Models of Light Reflection For Computer Synthesized Pictures," SIGGRAPH Proceedings, pages 192–198, July 1977.

When this improvement is applied to the Gouraud shading model, however, the problems associated with light intensity interpolation still exist. If this improvement is applied to the Phong model, the specular component computation is still demanding since the reciprocal square root calculation is still required to normalize the normal vector at the point or pixel under consideration.

A further attempt to provide a less computationally demanding specular reflectivity model exists in which individual calculations of the intensities are avoided by using a second-degree Taylor expansion to approximate Phong shading data. This method is discussed in Bishop & Weiner, "Fast Phong Shading," ACM Vol. 20, No. 4, July 1986, pages 103–106.

This method is still substantially more complex than Gouraud shading, and yet introduces additional approximations as compared to the Phong method.

SUMMARY OF THE INVENTION

The invention is a method and apparatus for modeling the specular reflection of light from a surface of an object to be graphically imaged.

In accordance with one embodiment of a method of the invention, a portion of the object to be imaged is modeled with one or more surfaces. In one or more embodiments, the surface comprises a quadratic triangular Bezier surface having three vertices and three edge midpoints.

A sine value associated with a highlight angle is determined. In at least one embodiment, the sine value comprises the sine squared value of the angle between a normal vector and a halfway vector at each vertex and edge midpoint. A control value is determined at each vertex and edge midpoint based on the sine values.

A specular input value at one or more other points on the surface is determined from the control values. In one or more embodiments, the specular input value is dependent upon the barycentric coordinates of the particular point in relation to the vertices and edge midpoints. The specular input value at each point is utilized to determine the specular reflection component of light at each point.

In one or more embodiments, the specular input component at each point is reparametrized to fall within the range of 1 to 0 before being used to calculate the specular reflection component. In at least one embodiment, the reparametrization is accomplished with a cubic spline function.

In one or more embodiments, the specular component at each point is added to an ambient light component and a diffuse light component to generate a combined light data component for that point.

In one or more embodiments, computer hardware is arranged to perform the method of the invention.

Further objects, features, and advantages of the present invention over the prior art will become apparent from the detailed description of the drawings which follows, when considered with the attached figures.

BRIEF DESCRIPTION OF THE DRAWINGS

FIG. 1 illustrates a triangular polygon used to model a portion of a surface of an object in accordance with a method of the prior art, the polygon having vertices $V_1$, $V_2$ and $V_3$, points $P_5$ and $P_6$ along edges extending between vertices $V_1$ and $V_3$ and $V_2$ and $V_3$, respectively, and a point $P_4$ positioned along a horizontal scan line between points $P_5$ and $P_6$;

FIG. 2 illustrates the interrelationship of a normal vector N at a point on a surface, along with a light vector L along which incoming light travels and is reflected along a reflection vector R, a viewing vector V along which a viewer views the point, and a halfway vector H;

FIG. 3 is a flowchart illustrating a method of modeling specular reflection in accordance with one embodiment of the invention;

DETAILED DESCRIPTION OF THE PREFERRED EMBODIMENT

In general, the invention is an apparatus and method for modeling the specular reflection of light from a surface/object. In the following description, numerous specific details are set forth in order to provide a more thorough description of the present invention. It will be apparent, however, to one skilled in the art, that the present invention may be practiced without these specific details. In some instances, well-known features may have not been described in detail so as not to obscure the invention.

Portions of the disclosure of this patent document may contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Java™ and all Java-based trademarks and logos are trademarks or registered trademarks of Sun Microsystems, Inc. in the United States and other countries. All SPARC™ trademarks are used under license and are trademarks or registered trademarks of SPARC International in the United States and other countries. Products bearing SPARC trademarks are based upon an architecture developed by Sin Microsystems, Inc.

Method of Modeling Specular Reflection

A method of the invention will now be described in more detail with reference first to FIG. 3.

Figure 4:
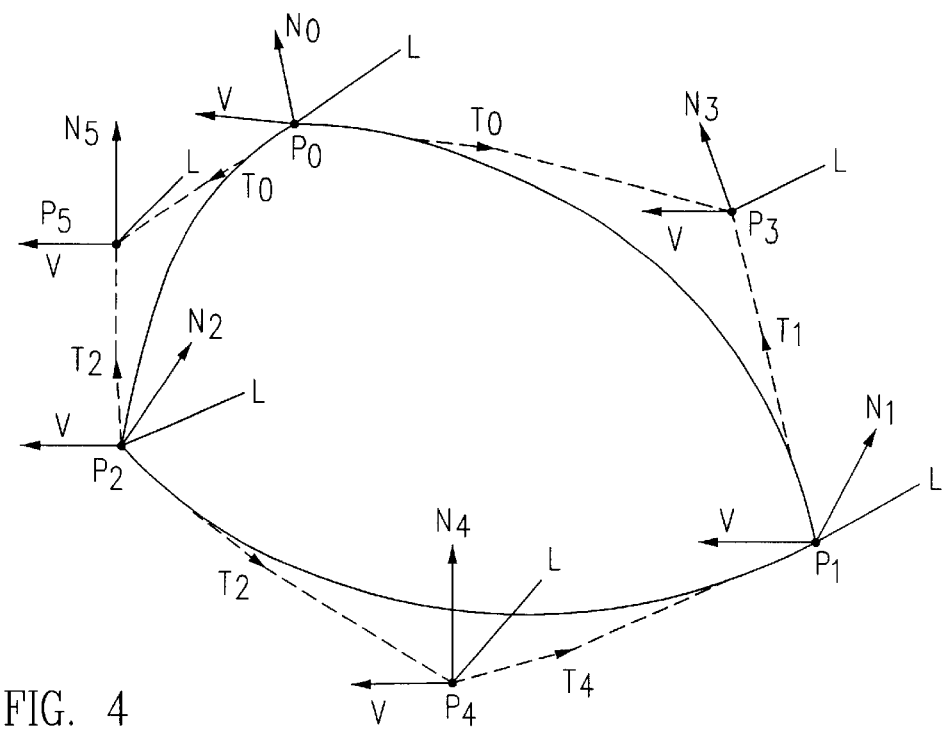
FIG. 4 illustrates a quadratic triangular Bezier surface used in a method of modeling specular reflection in accordance with the invention.

In accordance with one embodiment of the method, in a first step S1, the surface of an object to be graphically modeled is divided or broken up into one or more surfaces. In one embodiment of the invention, each surface has at least one vertex and at least one edge having an edge point corresponding thereto. In a more specific embodiment of the invention, each surface comprises a quadratic triangular Bezier surface. (Note: Bicubic interpolation has been used to interpolate specular reflection, as discussed by Shantz and Lien in "Shading Bicubic Patches" which appears in the 1987 proceedings of the ACM Siggraph Conference. Quadratic interpolation not using the Bezier formulation has been used to interpolate specular reflection, as described by Kirk and Voorhies in "The Rendering Architecture of the DN 1000VS" which appears in the 1990 proceedings of the ACM Siggraph Conference.) FIG. 4 illustrates such a surface.

The triangular quadratic Bezier surface and its characteristics are well known to those of skill in the art. In general, this surface has vertices $P_0$, $P_1$ and $P_2$. These vertices $P_0$, $P_1$ and $P_2$ are connected by "edges" generally comprising parabolas.

Points $P_3$, $P_4$ and $P_5$ are the Bezier midpoints of the quadratic edges of the triangle. Each of these edge midpoints $P_3$, $P_4$ and $P_5$ are positioned off of the parabolic edge, the exact position of which is defined by the intersection of lines T tangent to the edge at the vertices $P_0$, $P_1$ and $P_2$ of that edge, as is well known.

The position of any point P corresponding to a quadratic Bezier surface can be defined with barycentric coordinates ($b_x$, $b_y$, $b_z$). In particular, given these barycentric coordinates, and the vertices $P_0$, $P_1$ and $P_2$, as well as the edge midpoints $P_3$, $P_4$ and $P_5$, the point P may be calculated using the vector-valued function:

$$P=b_0^2 P_0+b_1^2 P_2+b_2^2 P_2+2b_0 b_1 P_3+2b_1 b_2 P_4+2b_2 b_0 P_5=(b_0 P_0+2b_1 P_3)b_0+(b_1 P_1+2b_2 P_4)b_1+(b_2 P_2+2b_0 P_5)b_2.$$

Referring again to FIG. 3, in a second step S2 of the method, unit normal vectors $N_0$/$N_1$ and $N_2$ are determined at the vertices $P_0$, $P_1$ and $P_2$, in a manner similar to that of the Phong and Gouraud shading methods and well known to those of skill in the art.

Using the unit normal vectors $N_0$, $N_1$ and $N_2$, in a step S3 the normal vectors $N_3$. $N_4$ and $N_5$ at the midpoint $P_3$, $P_4$ and $P_5$ of each edge of the quadratic surface are determined. In one embodiment of the invention, these normal vectors $N_3$, $N_4$ and $N_5$ at the edge midpoints $P_3$, $P_4$ and $P_5$ are determined by interpolation from the normal vectors $N_0$, $N_1$ and $N_2$ at the vertices $P_0$, $P_1$ and $P_2$ of the particular edge to which the point corresponds. In an embodiment where the interpolation is linear, the normal vector $N_3$ is calculated by interpolation from the normal vectors $N_0$ and $N_1$, the normal vector $N_5$ is calculated by interpolation from the normal vectors $N_0$ and $N_2$, and the normal vector $N_4$ is calculated by interpolation from the normal vectors $N_1$ and $N_2$. The normal vectors $N_3$, $N_4$ and $N_5$ at the midpoints are then converted to unit normal vectors.

Next, in a step S4, a sine value associated with a "highlight angle" is determined. The term "highlight angle" is intended to mean an angle which serves to define the existence of a specular highlight, such as the angle between the reflection vector R and view vector V (see FIG. 2 above), or an approximation thereto, such as the angle between the normal vector N and halfway vector H (see also FIG. 2 above).

In one embodiment, the sine value comprises the sine squared value of the angle between the unit normal vectors $N_0$, $N_1$, $N_2$, $N_3$, $N_4$ and $N_5$ at the edge midpoints and the vertices and the halfway vector H at each of these points. This value may be determined from the following calculation:

$$\text{sine}^2=(N\times H)\cdot(N\times H)=1-(N\cdot H)^2=s,$$

where N×H represents the cross-product between the N and H vectors, and N·H represents the dot product between the N and H vectors.

As stated above, the H vector man be calculated in accordance with the well known equation H=(L+V)/|L+V|, where |L+V| represents the magnitude of L+V. Use of the H vector avoids computation of the reflection vector R as also described above. In another embodiment, the sine squared value of the angle between the reflection and view vectors R and V may be calculated.

It is possible to determine only the sine (and not sine squared) of the angle between these vectors in accordance with the equation:

$$\text{sine}=(N\times H)=((N\times H)\cdot(N\times H))^{1/2}.$$

In this equation N×H is again the cross-product between the normal vector N and the halfway vector H.

It is desirable, however, to avoid the use of this equation to eliminate both the need to calculate the more complex cross-product between the vectors and the need to calculate a square root.

The sine value s defined above is calculated at each point $P_0$, $P_1$, $P_2$, $P_3$, $P_4$ and $P_5$, rendering sine values $s_0$, $s_1$, $s_2$, $s_3$, $s_4$ and $s_5$.

These sine values ($s_0$, $s_1$, $s_2$, $s_3$, $s_4$ and $s_5$) are then turned into control values for the surface in accordance with a step S5 of the method. When the surface is a quadratic triangular Bezier surface, the control values $S_0$, $S_1$, $S_2$, $S_3$, $S_4$ and $S_5$ are determined in accordance with the equations:

$$S_0 = s_0$$
$$S_1 = s_1$$
$$S_2 = s_2$$
$$S_3 = (4s_3 - s_0 - s_1)/2$$
$$S_4 = (4s_4 - s_1 - s_2)/2$$
$$S_5 = (4s_5 - s_2 - s_0)/2$$

In a step S6, these control values $S_0$, $S_1$, $S_2$, $S_3$, $S_4$ and $S_5$ are then utilized to determine or obtain a "specular input" value "s" at each particular point or pixel. When the surface is a quadratic triangular Bezier surface, this is accomplished by substituting control values $S_0$, $S_1$, $S_2$, $S_3$, $S_4$ and $S_5$ in place of $P_0$, $P_1$, $P_2$, $P_3$, $P_4$ and $P_5$ in the above-referenced equation:

$$P = b_0^2 P_0 + b_1^2 P_2 + b_2^2 P_2 + 2b_0 b_1 P_3 + 2b_1 b_2 P_4 + 2b_2 b_0 P_5$$
$$= (b_0 P_0 + 2b_1 P_3)b_0 + (b_1 P_1 + 2b_2 P_4)b_1 + (b_2 P_2 + 2b_0 P_5)b_2;$$

substituting "S" terms:

s at a particular point or pixel having barycentric coordinates ($b_0$, $b_1$, $b_2$)

$$S=(b_0 S_0+2b_1 S_3)b_0+(b_1 S_1+2b_2 S_4)b_1+(b_2 S_2+2b_0 S_5)b_2$$

An advantage of interpolating using a quadratic triangular Bezier surface, as represented by the above equation, is that even if no specular reflection is present at any of points $P_0$, $P_1$, $P_2$, $P_3$, $P_4$ or $P_5$, the quadratic interpolation may still produce a specular reflection at the interpolated point.

In accordance with one embodiment of the invention, in a step S7, the "s" or specular input value for a particular point or pixel is scaled to fall in the range from zero to one. This may be accomplished by using the calculated term "s" as the input to a cubic spline function that defines the specular reflection r to be:

$$r=1-t^2(3-2t);$$

where "t" represents a reparametrization of s relative to upper and lower limit terms $s_{hi}$ and $s_{lo}$. Using $s_{hi}$ and $s_{lo}$, s is reparametrized to the interval (0,1), represented by t. Then t is used to calculate r such that when $s=s_{hi}$, r=0 and when $s=s_{lo}$, r=1, with t smoothly transitioning in between:

$$t=(s-s_{lo})/(s_{hi}-s_{lo})$$

In general, however, the values $s_{hi}$ and $s_{lo}$ are chosen knowing that the maximum specular reflection occurs when the viewing vector V lies along the reflection vector R (i.e. an angle of 0 degrees) or the halfway vector H lies along the normal vector N (i.e. an angle of 0 degrees), and quickly tapers off as the angle becomes larger. The exact values of $s_{hi}$ and $s_{lo}$ may be chosen in part based on the surface which is being imaged, knowing that these values will determine the size of the imaged specular reflection. For example, $s_{hi}$ and $s_{lo}$ may comprise the sine (or sine squared values, in the case where the sine squared values are used to calculate the control values) of 0.15 and 0.01 degrees, respectively.

The reparametrized sine or specular input value "r" at the particular point or pixel can then be used in a step S8 to determine the specular light component at the particular point or pixel in accordance with the following calculation:

$$I_{specular\ component}=I_i*[k_s(r)]$$

where $I_i$ is the incident light intensity and $k_s$ is a spectral-reflection coefficient.

In this arrangement, the reparametrized specular input value "r" takes the place of the value $(R \cdot V)^n$ in the Gouraud and Phong shading methods, and takes the place of the value $(N \cdot H)^n$ in the Blinn method, and is simpler to compute than those methods.

This specular component may then be added to the ambient and diffuse light intensity components to generate a single light intensity output component in accordance with the calculation:

$$I=I_a*k_a+I_i*[k_d(L*N)]+I_{specular\ component}$$

where $I_a$ is the ambient light intensity, $k_a$ is an ambient coefficient and $k_d$ is a diffuse-reflection coefficient.

Instead of separating the light intensity components, the following light intensity calculation may be utilized to calculate the total light intensity at a point or pixel:

$$I=I_a*k_a+I_i*[k_d(L*N)+k_s(r)]$$

Those of skill in the art will appreciate that the above-referenced calculations may be performed for different light color components at each particular pixel. In addition, other components or factors may be integrated into the light intensity calculation to compensate for a variety of other factors, such as atmospheric attenuation and the like. In this manner, the resultant light output data for a particular pixel provides the most accurate graphic portrayal of an image.

It is noted that the specular input value s for a particular point or pixel can be used directly to determine the specular component I (instead of the reparametrized value r, as described above). Use of the reparametrized value r, based on a higher cubic spline function has the advantage of providing a more precise definition of the specular reflection in the generated image.

The above-described method of modeling the specular reflection has numerous advantages over the prior art methods. This method has been found to be much less computationally demanding than the prior art methods. Yet, the method is very accurate in modeling specular reflection. In particular, the use of the sine function instead of the cosine function provides more accurate results where the angle between the highlight and normal or view and reflection vectors is very small (i.e. the sine value approaches 0). This is important, since the maximum specular reflection occurs when the angle is 0, and falls off dramatically as the angle increases from 0 degrees.

The accuracy of the method in modeling specular reflection, including as a comparison, the results obtained by using the Phong method, is at least somewhat dependent upon the ability of the quadratic triangular Bezier surface to approximate or model the object surface. It is well known that a Bezier surface can not exactly re-produce a sphere. Accordingly, calculations were used to determine the accuracy of the quadratic triangular Bezier surface in modeling a sphere.

In this calculation, a single quadratic triangular Bezier surface is used to model one octant of a surface of a sphere. It is assumed that the position of the vertices of the Bezier surface are located at $P_0$, $P_1$ and $P_2$ and that these vertices lie at unit distances along the x, y and z axes, respectively. Accordingly, the Cartesian coordinates of these vertices are (1,0,0), (0,1,0) and (0,0,1). These vertices are joined by a quadratic surface.

In this arrangement, the surface may be considered as subtending a solid angle of 90 degrees. The radius of this surface about its center (i.e. the point equidistant from the vertices $P_0$, $P_1$ and $P_2$) is 0.896. When the surface subtends smaller angles, the measured radius is as follows:

| Solid Angle | True Radius | Model Radius |
|---|---|---|
| 45 | 1 | 0.985 |
| 22.5 | 1 | 1.0012 |
| 11.25 | 1 | 0.9998 |
| 5.625 | 1 | 1.0012 |
| 2.8125 | 1 | 0.999997 |

When high accuracy is demanded, such as to 0.01, it may be seen that the triangular quadratic surface is satisfactory in modeling a true sphere up to subtended angles at or above about 22.5 degrees.

In some instances, the object to be modeled may need to be modeled with a large number of quadratic triangular Bezier surfaces to minimize the subtended angles. Alternatively, a cubic triangular Bezier surface or other higher order surface may be used instead.

Those of skill in the art will appreciate that FIG. 3 illustrates one specific arrangement of the method of the invention. Of course, this figure and the method may vary in accordance with the many other embodiments detailed above.

Embodiment of Computer Execution Environment (Hardware)

Figure 5:
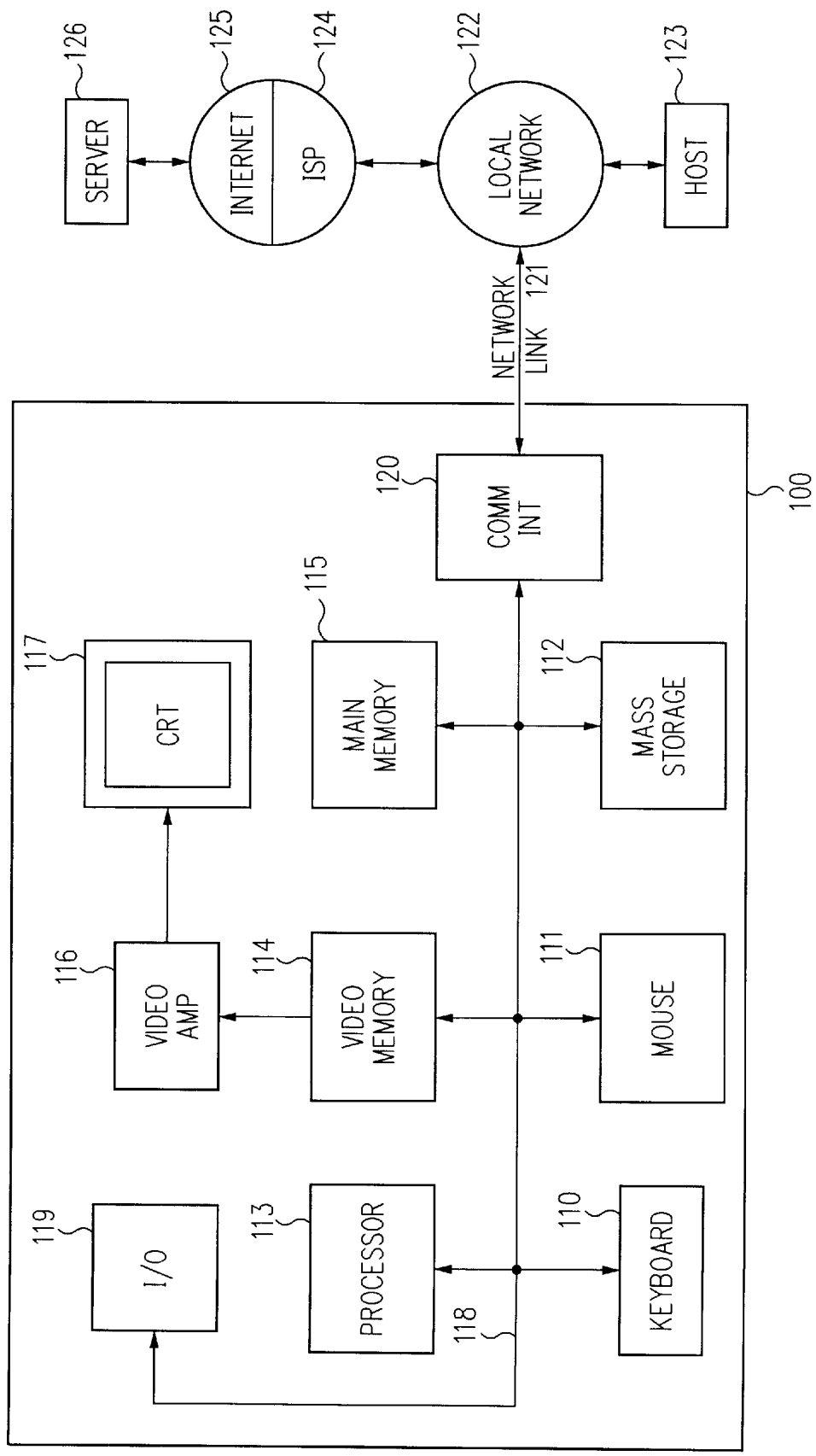
FIG. 5 diagramatically illustrates one embodiment of a computer system capable of providing a suitable execution environment for an embodiment of the invention.

An embodiment of the invention can be implemented as computer software in the form of computer readable code executed on a general purpose computer such as a computer 100 illustrated in FIG. 5, or in the form of bytecode class files executable within a Java™ runtime environment running on such a computer. A keyboard 110 and a mouse 111 are coupled to a system bus 118. The keyboard and mouse are for introducing user input to the computer system and communicating that user input to a processor 113. Other suitable input devices may be used in addition to, or in place of, the mouse 111 and the keyboard 110. An I/O (input/output) unit 119 coupled to a system bus 118 represents such I/O elements as a printer, A/V (audio/video) I/O, etc.

The computer 100 includes a video memory 114, a main memory 115 and a mass storage 112, all coupled to the system bus 118 along with the keyboard 110, the mouse 111 and the processor 113. The mass storage 112 may include both fixed and removable media, such as magnetic, optical or magnetic optical storage systems or any other available mass storage technology. The bus 118 may contain, for example, sixty-four address lines for addressing a video memory 114 or a main memory 115. The system bus 118 also includes, for example, a 64-bit data bus for transferring data between and among the components, such as the processor 113, the main memory 115, the video memory 114 and the mass storage 112. Alternatively, multiplex data/address lines may be used instead of separate data and address lines.

In one embodiment of the invention, the processor 113 is a microprocessor manufactured by Sun Microsystems, Inc., such as a SPARC™ microprocessor, or a microprocessor manufactured by Motorola, such as the 680X0 processor, or a microprocessor manufactured by Intel, such as the 80X86, or Pentium processor. However, any other suitable microprocessor or microcomputer may be utilized The main memory 115 is comprised of dynamic random access memory (DRAM). The video memory 114 is a dual-ported video random access memory. One port of the video memory 114 is coupled to a video amplifier 116. The video amplifier 116 is used to drive a cathode ray tube (CRT) raster monitor 117. The video amplifier 116 is well known in the art and may be implemented by any suitable apparatus. This circuitry converts pixel data stored in the video memory 114 to a raster signal suitable for use by the monitor 117. The monitor 117 is a type of monitor suitable for displaying graphic images. Alternatively, the video memory could be used to drive a flat panel or liquid crystal display (LCD), or any other suitable data presentation device.

The computer 100 may also include a communication interface 120 coupled to the bus 118. The communication interface 120 provides a two-way data communication coupling via a network link 121 to a local network 122. For example, if the communication interface 120 is an integrated services digital network (ISDN) card or a modem, the communication interface 120 provides a data communication connection to the corresponding type of telephone line, which comprises part of the network link 121. If the communication interface 120 is a local area network (LAN) card, the communication interface 120 provides a data communication connection via the network link 121 to a compatible LAN. The communication interface 120 could also be a cable modem or wireless interface. In any such implementation, the communication interface 120 sends and receives electrical, electromagnetic or optical signals which carry digital data streams representing various types of information.

The network link 121 typically provides data communication through one or more networks to other data devices. For example, the network link 121 may provide a connection through a local network 122 to a local server computer 123 or to data equipment operated by an Internet Service Provider (ISP) 124. The ISP 124 in turn provides data communication services through the world wide packet data communication network now commonly referred to as the "Internet" 125. The local network 122 and Internet 125 both use electrical, electromagnetic or optical signals which carry digital data streams. The signals through the various networks and the signals on the network link 121 and through the communication interface 120, which carry the digital data to and from the computer 100, are exemplary forms of carrier waves transporting the information.

The computer 100 can send messages and receive data, including program code, through the network(s), the network link 121, and the communication interface 120. In the Internet example, a remote server computer 126 might transmit a requested code for an application program through the Internet 125, the ISP 124, the local network 122 and the communication interface 120.

The received code may be executed by the processor 113 as it is received, and/or stored in the mass storage 112, or other non-volatile storage for later execution. In this manner, the computer 100 may obtain application code in the form of a carrier wave.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

Figure 6:
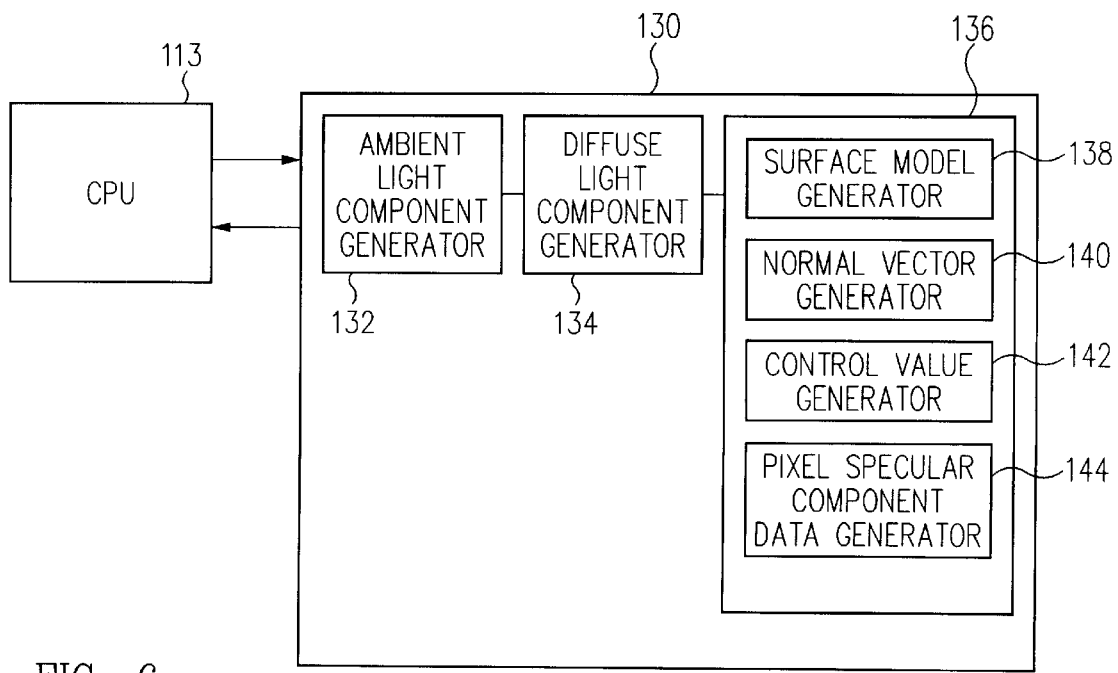
FIG. 6 diagramatically illustrates one embodiment of a light component data generator system for use smith the computer system illustrated in FIG. 5.

In one or more embodiments, the computer 100 and/or CPU 113 may include a light component data generator system 130, such as that illustrated in FIG. 6. Such a system 130 may comprise hardware and/or software associated with the computer 100 and/or CPU 113.

In the arrangement illustrated in FIG. 6, the system 130 includes an ambient light component generator 132, a diffuse light component generator 134, and a specular light component generator 136. The system 130 may be arranged to provide pixel light data which is output to the video memory 115.

In the embodiment illustrated in FIG. 6, the specular light component generator 136 comprises a surface model generator 138, a normal vector generator 140, a control value generator 142, and a pixel specular component data generator 144. In general, the surface model generator 138 is arranged to accomplish step S1 of the method illustrated in FIG. 3. The normal vector generator 140 is arranged to accomplish steps S2 and S3. The control value generator 142 is arranged to accomplish steps S4 and S5. The pixel specular component data generator 144 is arranged to accomplish step S6 and S8, and if reparametrization is utilized, step S7.

The computer system described above is specifically arranged to perform the method illustrated in FIG. 3. Of course, the system may be modified or altered to perform other arrangements of the method, as described in detail above.

The computer systems described above are for purposes of example only. An embodiment of the invention may be implemented in any type of computer system or programming or processing environment, including embedded devices (e.g., web phones, etc.) and "thin" client processing environments (e.g., network computers (NC's), etc.) that support a virtual machine.

Of course, the foregoing description is that of one or more embodiments of the invention, and various changes and modifications may be made without departing from the spirit and scope of the invention, as defined by the claims.

What is claimed is:

1. A system comprising
   a processor;
   a memory coupled to said processor;
   code executed by said processor configured to determine a specular reflection component of an object to be graphically imaged, comprising the steps of:
      modeling a portion of said object to be imaged with one or more surfaces having at least one vertex and at least one edge having an edge point corresponding thereto;
      determining a sine value associated with a highlight angle at each vertex and edge point;
      determining a control value at each vertex and edge point based upon said sine values;
      determining a specular input value at a particular point on said surface from said control values; and
      determining a specular reflection component at said point based on said specular input value at said point.

2. The system in accordance with claim 1, wherein said surface comprises a quadratic triangular Bezier surface.

3. The system in accordance with claim 2, wherein each edge point comprises a midpoint corresponding to each edge of said surface.

4. The system in accordance with claim 1, wherein said step of calculating said sine value comprises calculating the sine square value of said angle.

5. The system in accordance with claim 1, wherein said highlight angle comprises the angle between a halfway vector and a normal vector at each vertex and edge point.

6. The system in accordance with claim 1, wherein said highlight angle comprises the angle between a view vector and a reflection vector at each vertex and edge point.

7. The system in accordance with claim 1 wherein said step of determining a specular input value at a particular point comprises determining such a value dependent upon said control values and a positional relationship of said particular point with respect to said vertices and edge points.

8. The system in accordance with claim 1, further including the step of reparametrizing said specular input value at said point on a scale between 1 and 0 and wherein said specular reflection component is determined from said reparametrized specular input value.

9. The system in accordance with claim 8, wherein said step of reparametrizing comprises obtaining a value r by subtracting a predetermined low specular input value from said specular input value at said point and dividing said result by the difference between a predetermined high specular input value and said low specular input value, producing a value t, and where $r=1-t^2(3-2t)$.

10. The system in accordance with claim 1 further including the step of reparametrizing said specular input value at said point using a cubic spline function.

11. The system in accordance with claim 1, wherein said surface has vertices $P_0$, $P_1$, and $P_2$ and edge points $P_3$, $P_4$, and $P_5$, said control values $S_0$, $S_1$, $S_2$, $S_3$, $S_4$ and $S_5$ at $P_0$, $P_1$, $P_2$, $P_3$, $P_4$ and $P_5$, respectively, comprise $s_0$, $s_1$, $s_2$, $(4s_3-s_0-s_1)/2$, $(4s_4-s_1-s_2)/2$ and $(4s_5-s_2-s_0)/2$, where $s_0$, $s_1$, $s_2$, $s_3$, $s_4$ and $s_5$ represent said sine values at $P_0$, $P_1$, $P_2$, $P_3$, $P_4$ and $P_5$.

12. The system in accordance with claim 11, wherein said specular input value at said point comprises $(b_0S_0+2b_1S_3)b_0+(b_1S_1+2b_2S_4)b_1+(b_2S_2+2b_0S_5)b_2$, where $b_0$, $b_1$ and $b_2$ are barycentric coordinates of said point relative to said vertices $P_0$, $P_1$ and $P_2$.

13. The system in accordance with claim 1, wherein said sine value at each vertex and edge midpoint comprises the square of the dot product between a normal vector and a halfway vector, subtracted from the value 1.

14. The system in accordance with claim 1, wherein said specular input value is obtained from a set of barycentric coordinates for said point in relation to said vertices and edge points and said sine values at said vertices and edge points.

15. The system in accordance with claim 1, further including the step of determining a light data component for said point comprising an ambient light component, a diffuse light component and said specular light component.

16. A method of determining a specular reflection component of an object to be graphically imaged, comprising the steps of:
   modeling a portion of said object to be imaged with one or more surfaces having at least one vertex and at least one edge having an edge point corresponding thereto;
   determining a specular input value at a particular point on said surface; and
   determining a specular reflection component at said point based on said specular input value at said point.

17. The method in accordance with claim 16 wherein a sine value associated with a highlight angle at each vertex and edge point is determined.

18. The method in accordance with claim 17 wherein a control value at each vertex and edge point based upon said sine values is determined.

19. The method in accordance with claim 18 wherein a specular input value at a particular point on said surface is determined from said control values.

20. The method in accordance with claim 19, wherein said surface comprises a quadratic triangular Bezier surface.

21. The method in accordance with claim 20, wherein each edge point comprises a midpoint corresponding to each edge of said surface.

22. The method in accordance with claim 19, wherein said step of calculating said sine value comprises calculating the sine square value of said angle.

23. The method in accordance with claim 19, wherein said highlight angle comprises the angle between a halfway vector and a normal vector at each vertex and edge point.

24. The method in accordance with claim 19, wherein said highlight angle comprises the angle between a view vector and a reflection vector at each vertex and edge point.

25. The method in accordance with claim 19, wherein said step of determining a specular input value at a particular point comprises determining such a value dependent upon said control values and a positional relationship of said particular point with respect to said vertices and edge points.

26. The method in accordance with claim 19, further including the step of reparametrizing said specular input value at said point on a scale between 1 and 0 and wherein said specular reflection component is determined from said reparametrized specular input value.

27. The method in accordance with claim 26, wherein said step of reparametrizing comprises obtaining a value r by subtracting a predetermined low specular input value from said specular input value at said point and dividing said result by the difference between a predetermined high specular input value and said low specular input value, producing a value t, and where $r=1-t^2(3-2t)$.

28. The method in accordance with claim 19, further including the step of reparametrizing said specular input value at said point using a cubic spline function.

29. The method in accordance with claim 19, wherein said surface has vertices $P_0$, $P_1$, and $P_2$ and edge points $P_3$, $P_4$, and $P_5$, said control values $S_0$, $S_1$, $S_2$, $S_3$, $S_4$ and $S_5$ at $P_0$, $P_1$, $P_2$, $P_3$, $P_4$ and $P_5$, respectively, comprise $s_0$, $s_1$, $s_2$, $(4s_3-s_0-s_1)/2$, $(4s_4-s_1-s_2)/2$ and $(4s_5-s_2-s_0)/2$, where $s_0$, $s_1$, $s_2$, $s_3$, $s_4$ and represent said sine values at $P_0$, $P_1$, $P_2$, $P_3$, $P_4$ and $P_5$.

30. The method in accordance with claim 19, wherein said specular input value at said point comprises $(b_0S_0+2b_1S_3)b_0+(b_1S_1+2b_2S_4)b_1+(b_2S_2+2b_0S_5)b_2$, where $b_0$, $b_1$ and are barycentric coordinates of said point relative to said vertices $P_0$, $P_1$ and $P_2$.

31. The method in accordance with claim 30, wherein said sine value at each vertex and edge midpoint comprises the square of the dot product between a normal vector and a halfway vector, subtracted from the value 1.

32. The method in accordance with claim 19, wherein said specular input value is obtained from a set of barycentric coordinates for said point in relation to said vertices and edge points and said sine values at said vertices and edge points.

33. The method in accordance with claim 19, further including the step of determining a light data component for said point comprising an ambient light component, a diffuse light component and said specular light component.

* * * * *